(12) United States Patent
Kobayashi et al.

(10) Patent No.: US 7,330,197 B2
(45) Date of Patent: Feb. 12, 2008

(54) MIXED REALITY EXHIBITING METHOD AND APPARATUS

(75) Inventors: Toshihiro Kobayashi, Kawasaki (JP); Toshikazu Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 11/002,074

(22) Filed: Dec. 3, 2004

(65) Prior Publication Data
US 2005/0123171 A1 Jun. 9, 2005

(30) Foreign Application Priority Data
Dec. 4, 2003 (JP) ............................. 2003-406143

(51) Int. Cl.
*G09G 5/00* (2006.01)
(52) U.S. Cl. ................................... 345/633
(58) Field of Classification Search ............... 345/632, 345/633; 348/589; 702/95, 104; 715/706, 715/850
See application file for complete search history.

(56) References Cited

U.S. PATENT DOCUMENTS

| | | | |
|---|---|---|---|
| 5,633,993 A * | 5/1997 | Redmann et al. ............ 345/419 |
| 5,900,849 A | 5/1999 | Gallery ............................ 345/8 |
| 6,690,338 B1 * | 2/2004 | Maguire, Jr. ..................... 345/8 |
| 6,792,370 B2 | 9/2004 | Satoh et al. .................... 702/95 |
| 6,892,162 B2 * | 5/2005 | Morita .......................... 702/150 |
| 2002/0080145 A1 * | 6/2002 | Ishihara ........................ 345/589 |
| 2003/0184682 A1 | 10/2003 | Kobayashi ................... 348/589 |
| 2004/0021664 A1 * | 2/2004 | Takemoto et al. ............ 345/419 |
| 2004/0109009 A1 * | 6/2004 | Yonezawa et al. ............ 345/632 |
| 2004/0110565 A1 * | 6/2004 | Levesque ....................... 463/42 |
| 2004/0145594 A1 | 7/2004 | Kobayashi et al. ........... 345/633 |
| 2004/0249594 A1 | 12/2004 | Satoh et al. .................. 702/104 |

FOREIGN PATENT DOCUMENTS

| | | |
|---|---|---|
| CN | 1405034 | 3/2003 |
| EP | 1 336 916 | 8/2003 |
| EP | 1 349 382 | 10/2003 |
| JP | 2002-269593 | 9/2002 |
| WO | WO 2004/051480 A1 | 6/2004 |

OTHER PUBLICATIONS

Tobias Höllerer, et al., "User Interface Management Techniques for Collaborative Mobile Augmented Reality", Computers & Graphics, vol. 25, No. 5, pp. 799-810, XP004318025, ISSN: 0097-8493 (Oct. 2001).

* cited by examiner

*Primary Examiner*—Ryan Yang
(74) *Attorney, Agent, or Firm*—Fitzpatrick, Cella, Harper & Scinto

(57) ABSTRACT

In exhibition of a synthesized image which is obtained by synthesizing a virtual world image with a real world image observed from a viewpoint position and direction of a user, data representing a position and orientation of a user is acquired, a virtual image is generated based on the data representing the position and orientation of the user, and the virtual image is synthesized with a real image corresponding to the position and orientation of the user. Based on a measurable area of the position and orientation of the user, area data is set. Based on the data representing the position of the user and the area data, notification related to the measurable area is controlled.

12 Claims, 14 Drawing Sheets

FIG. 5
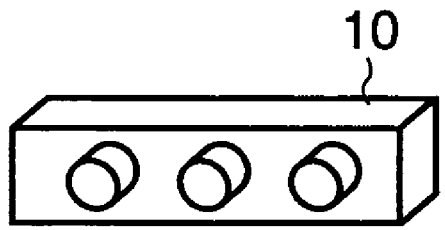
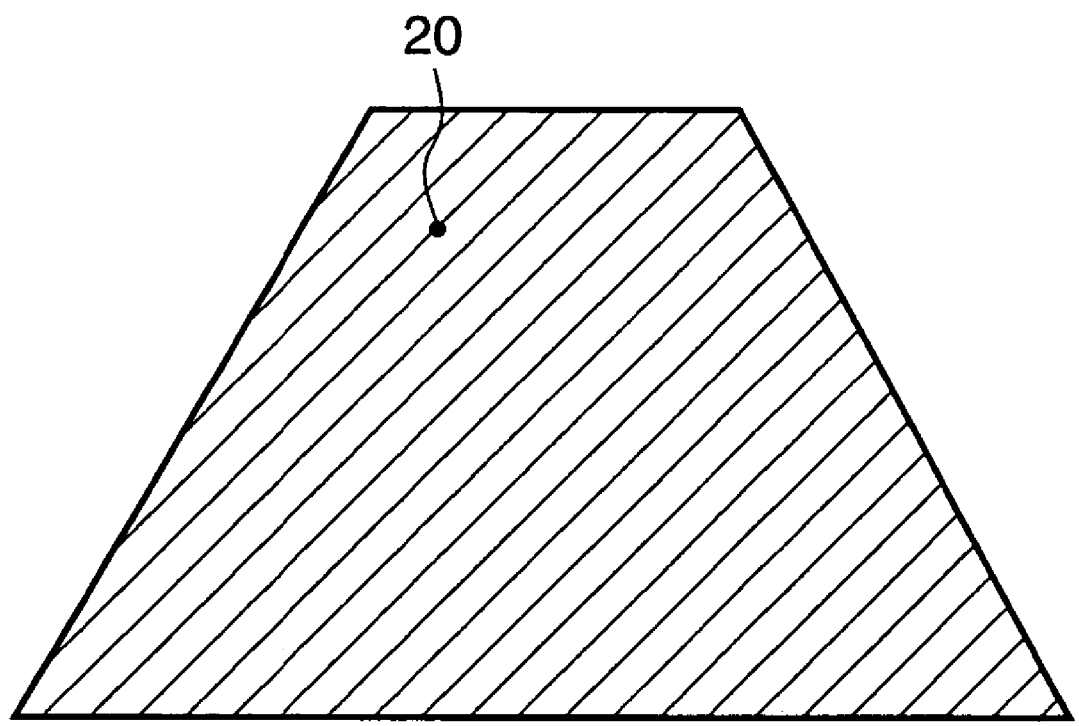

FIG. 12

| TRIANGULAR MESH S | | TRIANGULAR MESH A | | 400 |
|---|---|---|---|---|
| $S_1$ | $GQ_1Q_2$ | $A_1$ | $Q_1Q_2P_1$ | |
| $S_2$ | $GQ_2Q_3$ | $A_2$ | $Q_2Q_2P_1$ | |
| $S_3$ | $GQ_3Q_4$ | $A_3$ | $Q_2Q_3P_2$ | |
| ⋮ | ⋮ | ⋮ | ⋮ | |

MIXED REALITY EXHIBITING METHOD AND APPARATUS

FIELD OF THE INVENTION

The present invention relates to a method and an apparatus for exhibiting mixed reality. More particularly, the present invention relates to a technique preferable to appropriately guide a user of a mixed reality apparatus, during exhibition of mixed reality, in a way that the user does not go outside the area where the position and/or orientation of the user can be measured by a sensor.

BACKGROUND OF THE INVENTION

Apparatuses (called mixed reality apparatuses) applying a mixed reality (MR) technique, which combines the real world with a virtual world in a natural way without giving sense of oddness, have increasingly been proposed. These mixed reality apparatuses synthesize an image of a virtual world rendered by computer graphics (CG) with the real world sensed by an image sensing apparatus, e.g., a camera, and display the synthesized image on a display device, e.g., a head-mounted display (HMD), thereby exhibiting mixed reality to a user.

In order to generate an image of a virtual world that goes along the change in an image of the real world, it is necessary for such mixed reality apparatus to acquire the viewpoint position and/or orientation of the user of the apparatus in real time. Sensors for acquiring the position and/or orientation of the user's viewpoint are widely known. In the mixed reality apparatuses, the position and/or orientation of the user's viewpoint measured by a sensor are set as the position and/or orientation of the virtual viewpoint in a virtual world. Based on the setting, an image of the virtual world is rendered by CG and synthesized with the image of the real world. As a result, the user of the mixed reality apparatus is able to view an image as if a virtual object exists in the real world.

The aforementioned sensors are categorized into optical type, magnetic type, ultrasonic type, mechanical type and so on depending on the position/orientation measurement method. In any method, sensors cannot unlimitedly measure the position and/or orientation, and have constraints in the measuring range.

For instance, in a case of an optical sensor, a light emitting unit employing a device, e.g., a light emitting diode (LED), emits light by controlling of a sensor controller, then a photoreceptive unit, e.g., a camera, a line sensor or the like, receives the light from the light emitting unit, and the viewpoint position and/or orientation of the measuring target are determined based on the received light data. Under the condition where the photoreceptive unit cannot recognize the light emitted by the light emitting unit, e.g., a condition where the light emitting unit is too distanced from the photoreceptive unit, or a condition where there is a shielding object between the light emitting unit and the photoreceptive unit, the sensor is unable to measure the position and/or orientation of the measuring target.

Furthermore, in a case of a magnetic sensor, a sensor control unit controls a transmitter to generate a magnetic field, and a receiver measures the intensity of the magnetic field generated by the transmitter. Based on the direction of the magnetic field generated by the transmitter and the intensity of the magnetic field measured by the receiver, the viewpoint position and/or orientation of the measuring target are determined. Under the condition where the receiver cannot accurately measure the magnetic field generated by the transmitter, e.g., a condition where the transmitter is too distanced from the receiver, the sensor is unable to measure the position and/or orientation of the measuring target. Even if the transmitter is not distanced from the receiver, if there is a metal or magnetic substance near the measurement space, the magnetic field generated by the transmitter is distorted, resulting in a considerable error in the measured position and/or orientation.

A general mixed reality apparatus often requires strict precision in the sensor in order to combine the real world with a virtual world without giving sense of oddness. Therefore, under such condition of measuring errors in the position/orientation measurement, the mixed reality apparatus cannot practically be used.

For the above-described reasons, when a mixed reality apparatus is employed, it is necessary to determine in advance an area where a user of the mixed reality apparatus can move around based on the range where the sensor can accurately measure the position and/or orientation of the measuring target, and to limit the movement of the user to within the area (movable area). For instance, Japanese Patent Application Laid-Open (KOKAI) No. 2002-269593 discloses a construction for performing a procedure to terminate CG rendering in a case of deviating from an effective area where the position and/or orientation can be measured by a sensor.

However, the user of the mixed reality apparatus is not always aware of the movable area when he/she is using the mixed reality apparatus. Most of the time the user of the mixed reality apparatus recognizes an abnormality after the CG rendering of the virtual world becomes incorrect because of the fact that the user unintentionally moves outside the movable area during use of the apparatus and the sensor is unable to measure the viewpoint position and/or orientation of the user. Furthermore, it is often the case that the user, who feels some kind of abnormality at this point, is unable to recognize that the abnormality is caused by deviation from the movable area. Therefore, the user of the mixed reality apparatus is unable to figure out the cause of the abnormality and how to deal with the problem, causing a problem of giving discomfort to the user.

In a case of using a magnetic sensor as the sensor, since the position/orientation measurement error becomes large near the limit of the movable area, the user of the mixed reality apparatus can predict to some extent deviation from the movable area. However, in a case of using an optical sensor, position/orientation measurement is performed with high precision even near the limit of the movable area, as long as the user stays within the movable area. But at the moment the user goes outside the movable area, the position/orientation measurement stops. In other words, to the user of the mixed reality apparatus, the image of the virtual world is suddenly disturbed with no warning, and this further gives discomfort to the user.

In order to solve the above-described problem, conventionally, the following measures have been taken to guide the user of the mixed reality apparatus so as not to go outside the movable area. The measures include: putting a mark, e.g., a tape, near the boundary of the movable area in the real world in advance, providing a physical barrier, providing a dedicated aid to guide point by point the user of the mixed reality apparatus, and so on.

However, in general mixed reality apparatuses, the real world the user of the apparatus can view has a limit in terms of image resolution and a scope of the viewing field due to factors such as the performance of an image sensing device and a display device. Furthermore, because an image of a virtual world is superimposed on an image of the real world, part of the real world image is shielded by the virtual world image. Therefore, the user of the mixed reality apparatus cannot observe all parts of the real world. In other words, even if the movable area is marked in the real world, the mark is easily overlooked. Moreover, because the virtual world image shields part of the real world image, the user of the mixed reality apparatus may not be able to view the mark. Even in a case where a physical barrier is provided, the user of the mixed reality apparatus may not be able to view the physical barrier because of the above-described reason, and in some cases, the physical barrier may put the user at risk. The conventional mixed reality apparatuses are in need of improvements in terms of above-described points.

Meanwhile, in a case of providing a dedicated aid to guide the user of the mixed reality apparatus, the above-described problems are solved. However, a dedicated aid must be allocated each time the mixed reality apparatus is used. This increases the operational trouble and burden.

SUMMARY OF THE INVENTION

The present invention has been proposed in view of the above problems, and has as its object to simply, easily, and rationally realize an appropriate guidance to a user of a mixed reality apparatus, during exhibition of mixed reality, in a way that the user does not go outside the sensor-measurable area.

According to one aspect of the present invention, there is provided an information processing method comprising: an acquisition step of acquiring data representing a position and orientation of a user; a generation step of generating a virtual image based on the data representing the position and orientation of the user; a synthesizing step of synthesizing the virtual image with a real image corresponding to the position and orientation of the user; a setting step of setting area data based on a measurable area of the position and orientation of the user; and a control step of controlling notification related to the measurable area based on the data representing the position of the user and the area data.

According to another aspect of the present invention, there is provided an information processing method comprising: an acquisition step of acquiring position data of a user; a comparing step of comparing the position data of the user with previously acquired position data of the user; and a measurement step of measuring a measurable area of a position of the user based on a result of comparison.

According to the present invention, a user of the mixed reality apparatus can be guided with simple, easy, and rational means in a way that the user does not go outside the movable area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute part of the specification, illustrate embodiments of the invention and, together with the description, serve to explain the principles of the invention.

FIG. 5 is an explanatory view of a sensor and a measurement area of the sensor employed by the mixed reality apparatus according to the first embodiment;

FIG. 12 is a chart showing an example of a triangle structure table that registers a triangular mesh formed in the safe area and the warning area;

DETAILED DESCRIPTION OF THE PREFERRED EMBODIMENTS

Preferred embodiments of the present invention will now be described in detail in accordance with the accompanying drawings.

First, the space used by a mixed reality apparatus according to the embodiment of the present invention is described with reference to FIGS. 5 to 8. FIG. 5 is an explanatory view of a sensor and a measurement area of the sensor employed by the mixed reality apparatus according to the embodiment (hereinafter referred to as "this apparatus").

In FIG. 5, in the area indicated as a sensor's measurement area 20 (area represented by a hatched trapezoid), a sensor 10 is able to measure the viewpoint position and/or orientation of a user of this apparatus, which is the measuring target. Contrary, the sensor 10 is unable to measure the viewpoint position and/or orientation in the area outside the sensor's measurement area 20. Note that the sensor's measurement area 20 and boundary line thereof cannot be viewed with the naked eyes.

Figure 6:
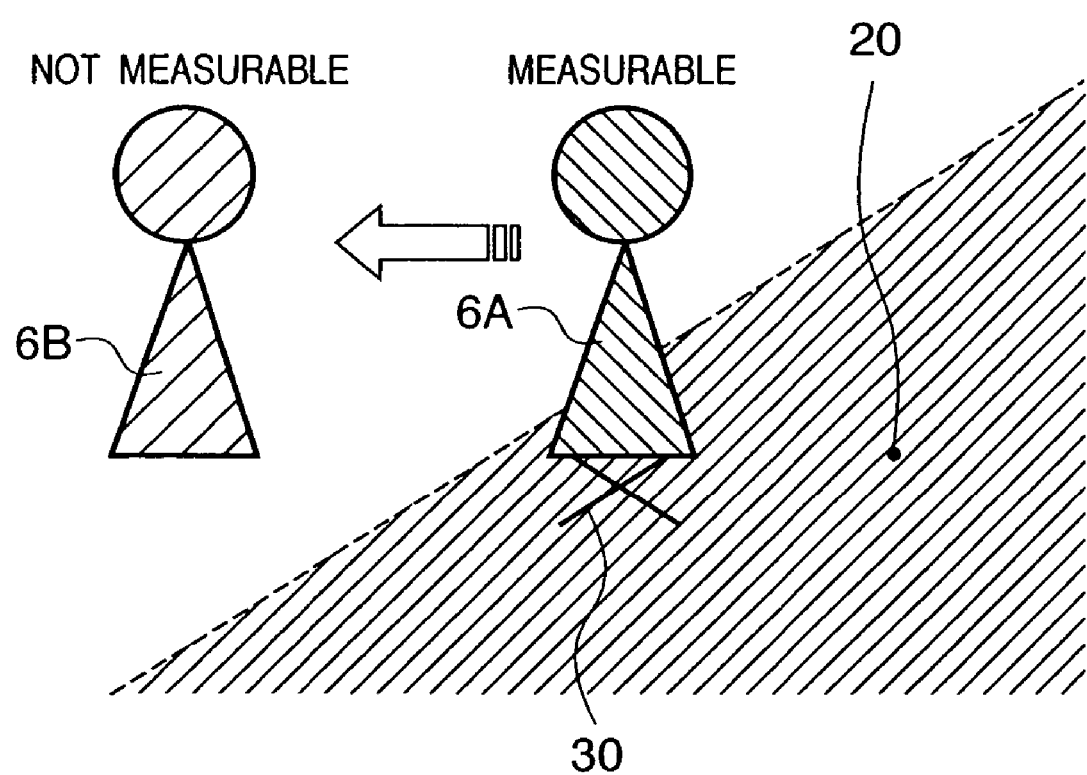
FIG. 6 is an explanatory view of a boundary-measured point.

FIG. 6 is an explanatory view of a boundary-measured point. In FIG. 6, the user (6A) of this apparatus stays inside the sensor's measurement area 20. In other words, in the state shown in FIG. 6, the viewpoint position and/or orientation of the user (6A) of this apparatus are measured by the sensor 10. On the contrary, in FIG. 6, the user (6B) of this apparatus has moved from inside to outside the sensor's measurement area 20. In other words, in the state shown in FIG. 6, the viewpoint position and/or orientation of the user (6B) of this apparatus cannot be measured by the sensor 10. When the state shifts from 6A to 6B (when the measuring target deviates from the sensor's measurement area 20), the point at which the position and/or orientation are measured in the state shown as 6A, i.e., the point at which the position and/or orientation are last measured inside the sensor's measurement area 20, is called a boundary-measured point 30.

Figure 7:
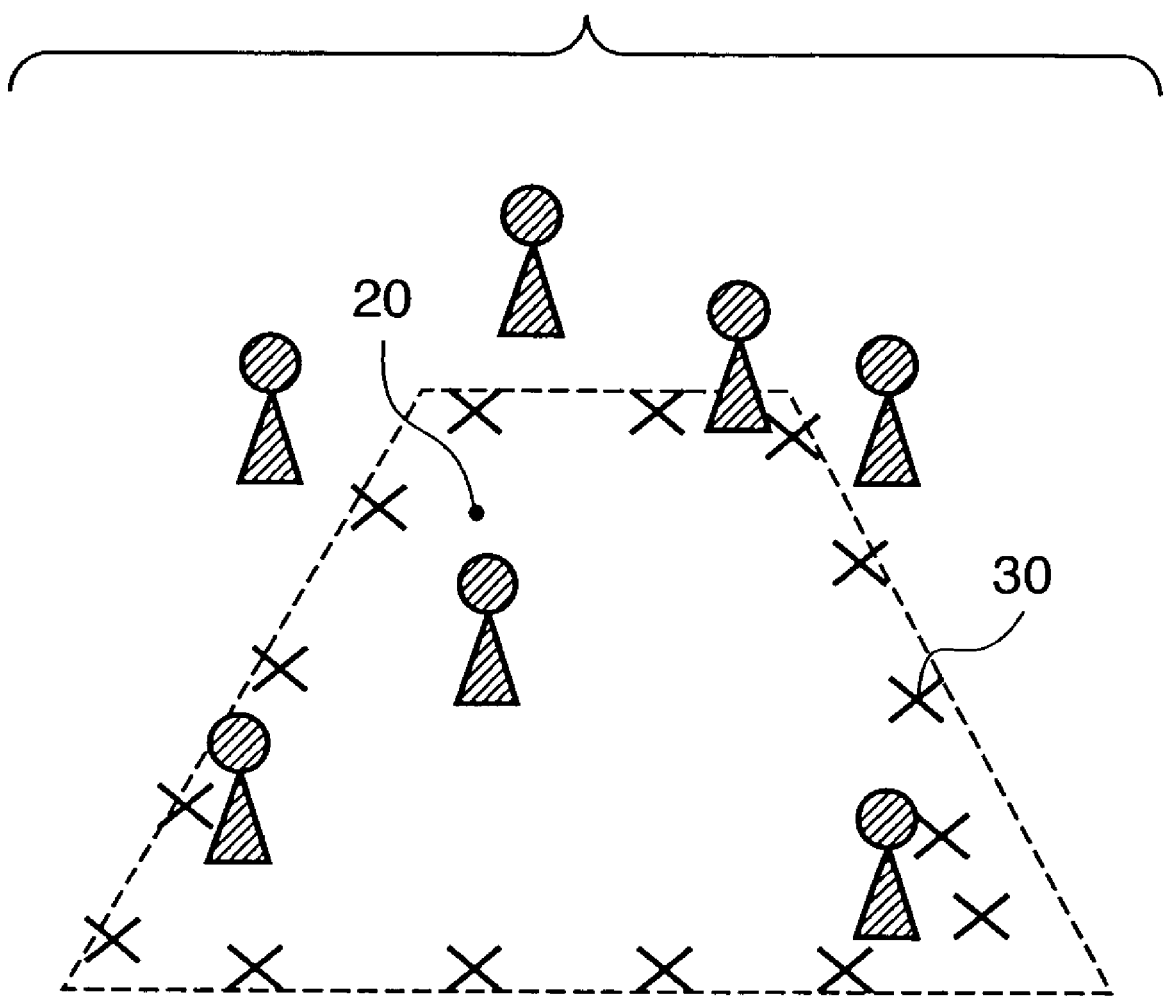
FIG. 7 is an explanatory view of boundary-measured point collection.

FIG. 7 is an explanatory view on collection of the boundary-measured points 30. Positions of the boundary-measured points are measured by the sensor 10 at a large number of places in the space used by this apparatus, particularly near the boundary of the sensor's measurement area 20. By measuring a large number of boundary-measured points, collecting and accumulating them in this manner, it is possible to obtain an area that can be regarded as a sensor's measurement area.

Figure 8:
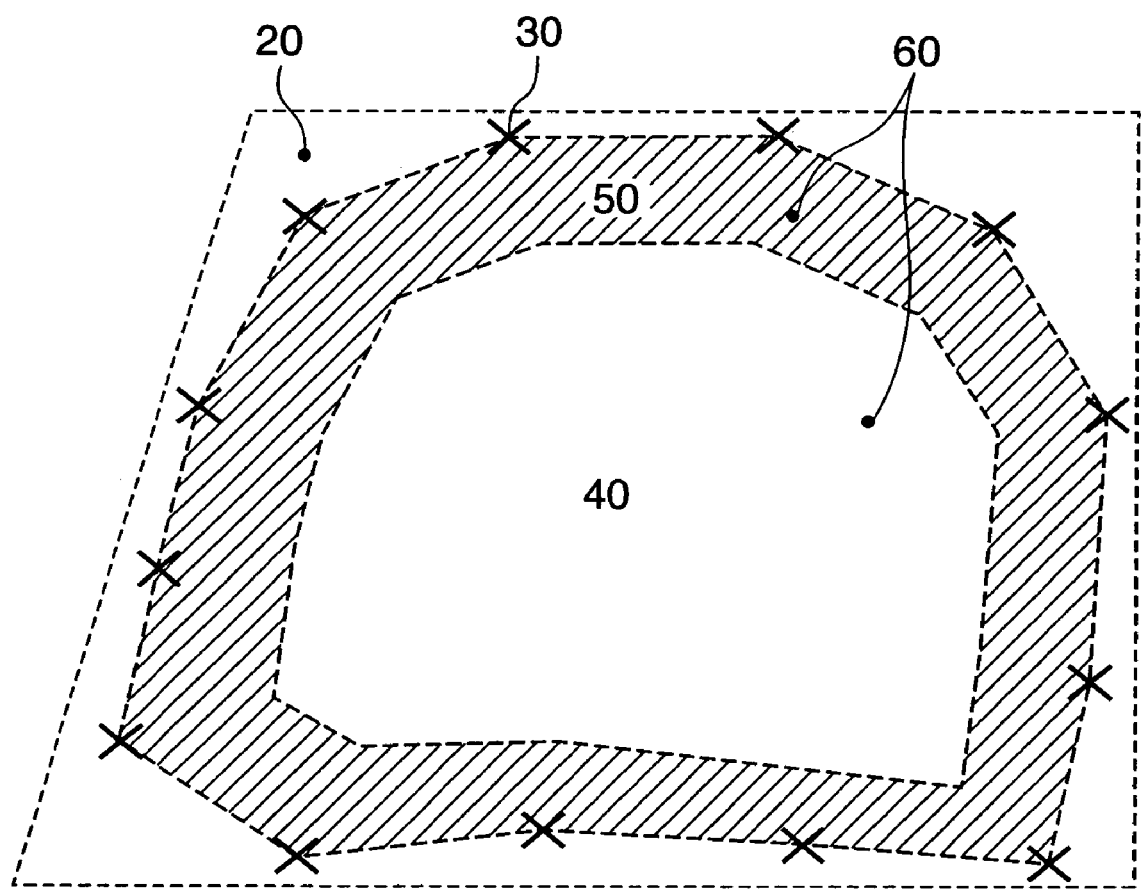
FIG. 8 is an explanatory view of a safe area, a warning area, and a movable area.

FIG. 8 is an explanatory view of a safe area, a warning area, and a movable area in the measurement area 20. By sequentially connecting the collected boundary-measured points 30 with a line, one closed area can be generated. When the number of boundary-measured points 30 is sufficiently large, it is possible to consider that the closed area is substantially equal to the sensor's measurement area 20. This area is defined as a movable area 60. Although the movable area 60 is not strictly equal to the sensor's measurement area 20, since the movable area 60 is included in the sensor's measurement area 20, position/orientation measurement by the sensor 10 is ensured within this area. Further, as shown in FIG. 8, the inner peripheral region of the movable area 60 is defined as a warning area 50. Although the warning area 50 is a measureable area of the sensor 10, since it neighbors the boundary of the sensor's measurement area 20, it has a high risk of deviating outside the sensor's measurement area 20 and not being able to perform the position/orientation measurement. Further, since the area other than the warning area 50 in the movable area 60 is rather away from the boundary of the sensor's measurement area 20, this area can be regarded as an area where position/orientation measurement by the sensor 10 is ensured. This area is defined as a safe area 40.

In each of the following embodiments, the positions of the boundary-measured points are presented to the user of the mixed reality apparatus when the user enters the warning area 50 and a warning is issued. Hereinafter, each of the embodiments is described in detail.

First Embodiment

Figure 1:
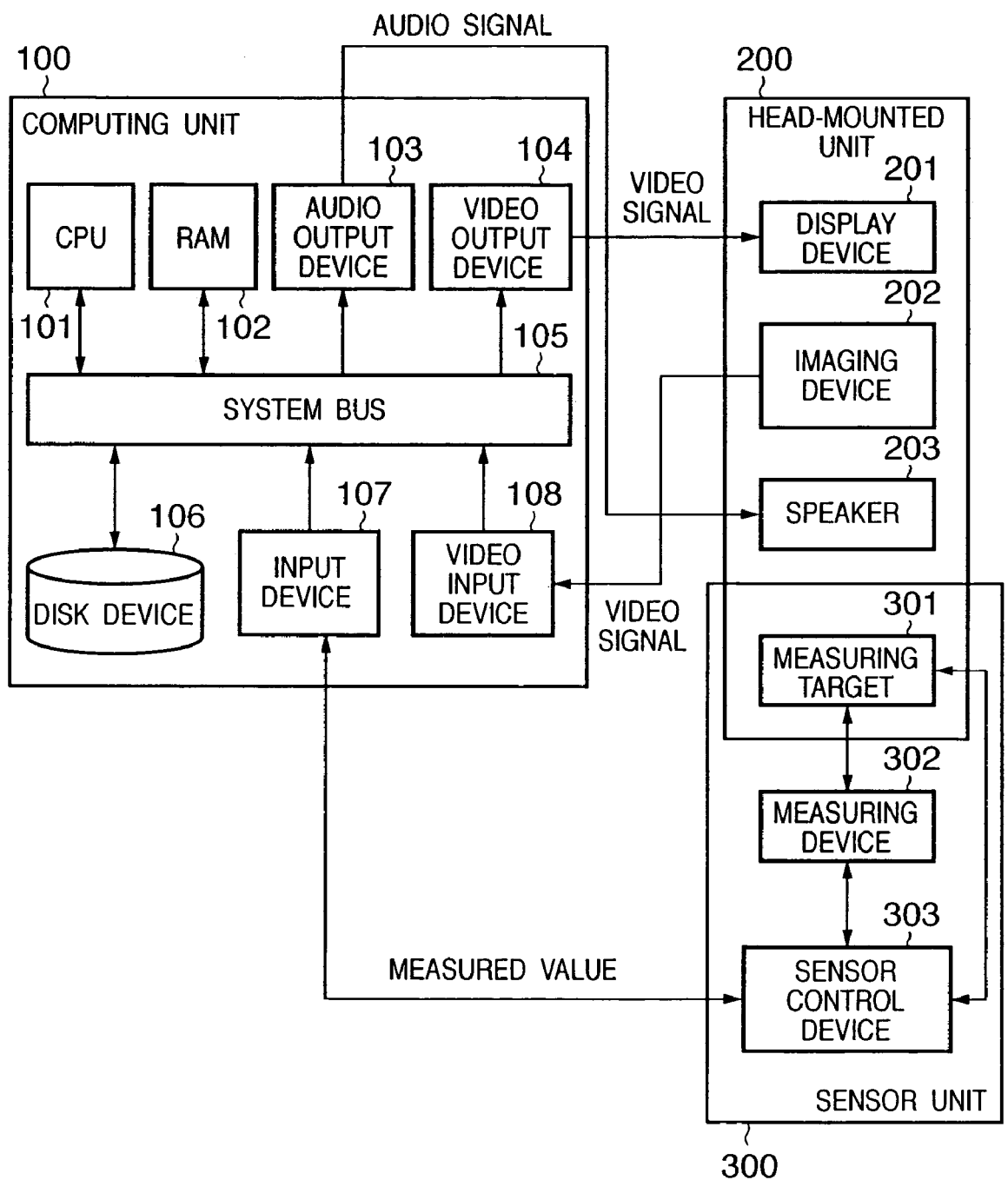
FIG. 1 is a block diagram showing a brief construction of a mixed reality apparatus according to the first embodiment.

FIG. 1 is a block diagram showing a brief construction of a mixed reality apparatus according to the first embodiment. Referring to FIG. 1, a computing unit 100 is constructed with computers and so on. The computing unit 100 comprises a CPU 101, RAM 102, an audio output device 103, a video output device 104, a system bus 105, a disk device 106, an input device 107, and a video input device 108.

The CPU 101 controls mixed reality processing based on a mixed reality program stored in ROM (not shown) or the RAM 102. The CPU 101, which is connected to the system bus 105, can mutually communicate with the RAM 102, audio output device 103, video output device 104, disk device 106, input device 107, and video input device 108. The RAM 102 is realized by a main storage device such as memory. The RAM 102 temporarily stores, through the system bus 105, program codes of the mixed reality program, control data of the program, CG data and measurement area data, as well as various data such as sensor's measurement values and so forth. The audio output device 103 is realized by a device such as a sound card. Through the system bus 105, the audio output device 103 inputs audio data generated by a program executed by the CPU 101, converts the audio data to an appropriate audio signal, and outputs it to a speaker 203.

The video output device 104 is realized by a device such as a graphics card. In general, the video output device 104 holds graphics memory (not shown). Image data which is generated by a program executed by the CPU 101 is written in the graphics memory contained in the video output device 104 through the system bus 105. The video output device 104 converts the image data written in the graphics memory to an appropriate video signal, and outputs it to a display device 201. The graphics memory is not necessarily held by the video output device 104, but the function of the graphics memory may be realized by the RAM 102.

Each of the devices constituting the computing unit 100 is connected to the system bus 105, which serves as a communication path for mutual communication among the aforementioned devices.

The disk device 106 is realized by an auxiliary storage device such as a hard disk. The disk device 106 holds program codes of the mixed reality program, control data of the program, CG object data of a virtual world, boundary-measured point data, area data and so on. The input device 107 is realized by various interface devices. For instance, the input device 107 realizes the function for inputting a signal as data from a device connected externally to the computing unit 100 and writing the data in the RAM 102 through the system bus 105. The video input device 108 is realized by a device such as a capture card. The video input device 108 inputs a video signal from an imaging device 202, and writes the image data in the RAM 102 or the graphics memory through the system bus 105. Note that the video input device 108 is not necessary in a case where an optical see-through display device is employed as the display device 201.

A head-mounted unit 200 is worn by a user of the mixed reality apparatus according to the first embodiment for experiencing the apparatus. The head-mounted unit 200 is constructed with a display device 201, an imaging device 202, a speaker 203, and a measuring target 301. In the first embodiment, although the user wears an apparatus that configures the head-mounted unit 200, as long as the user can experience mixed reality, the form of the apparatus is not limited to the head-mounted unit 200, but a desktop-type display device may be employed.

The display device 201 is realized by a display such as a video see-through HMD. The display device 201 is used for displaying a video signal outputted by the video output device 104, and for exhibiting mixed reality to the user of this apparatus. Although the display device 201 is an apparatus that constitutes the head-mounted unit 200, it is not necessarily mounted to the user. As long as the means enables the user to confirm the image, for instance, a desktop-type display device may be employed as the display device 201.

The imaging device 202 is realized by one or more image sensing devices such as CCD cameras. The imaging device 202 is used for sensing an image of the real world that is seen from the viewpoint of the user of this apparatus. Therefore, it is preferable that the imaging device 202 be mounted to the place close to the viewpoint position in the user's head. However, the mounting place is not limited to this as long as the means enables acquisition of an image that is seen from the user's viewpoint. The image sensed by the imaging device 202 is outputted to the video input device 108 as a video signal. Note that in a case where an optical see-through display device is employed as the display device 201, the user of this apparatus directly observes the real world that is transmitted through the display device 201. Therefore, the imaging device 202 is not necessary.

The speaker 203 is used for exhibiting the user of the apparatus an audio signal outputted by the audio output device 103. In the first embodiment, although the speaker 203 is an apparatus that constitutes the head-mounted unit 200, it is not necessarily mounted to the user as long as the user can confirm the sound. Furthermore, the speaker 203 is not necessary in a case of not using sound.

A sensor unit 300 measures the viewpoint position and/or orientation of the user of this apparatus. The sensor unit 300 is constructed with a measuring target 301, a measurement device 302, and a sensor control device 303. The measuring target 301, provided in the head-mounted unit 200 mounted to the user of this apparatus, is a target to be measured by the sensor. In other words, the measuring target 301 is a component of both the head-mounted unit 200 and the sensor unit 300. The measurement device 302 measures the position and/or orientation of the measuring target 301. The measurement device 302 is not mounted to the user of this apparatus, but is provided in a position where the measuring target 301 can be measured. The sensor control device 303 outputs a control command to the measuring target 301 and measurement device 302, and acquires measured data from the measuring target 301 and measurement device 302. Based on the acquired measured data, the sensor control device 303 calculates the position and/or orientation of the measuring target 301 and outputs it to the input device 107 as a measured value.

Note that the constructions of the measuring target 301, measurement device 302, and sensor control device 303 may differ depending on the type of sensor.

Taking an optical sensor OPTOTRAK 3020 available by Northern Digital for example, the measuring target 301 is configured with a light emitting device, which emits light in accordance with a command from the sensor control device 303. The measurement device 302 is configured with a photoreceptive device, which observes the light emitted by the light emitting device serving as the measuring target 301. The sensor control device 303 calculates the position and/or orientation of the measuring target 301 based on the observed data of the measurement device 302.

Furthermore, taking an optical sensor HiBall available by 3rdTech for example, the measuring target 301 is configured with a photoreceptive device while the measurement device 302 is configured with a light emitting device. The measurement device 302 emits light in accordance with a command from the sensor control device 303. The measuring target 301 observes the light emitted by the light emitting device serving as the measurement device 302. The sensor control device 303 calculates the position and/or orientation of the measuring target 301 based on the observed data of the measuring target 301 and arrangement data of the measurement device 302.

Furthermore, taking a magnetic sensor Fastrak available by the PolHemus for example, the measuring target 301 is configured with a receiver, which observes a magnetic field generated by a transmitter serving as the measurement device 302 and generates observed data. The measurement device 302 is configured with the transmitter, which generates a magnetic field in accordance with a command from the sensor control device 303. The sensor control device 303 calculates the position and/or orientation of the measuring target 301 based on the observed data of the measuring target 301.

Alternatively, a marker (not shown) is mounted to the user of this apparatus, then the marker is extracted from an image by performing image processing on the image sensed by an image sensing device (not shown) externally provided besides the imaging device 202, and the position and/or orientation of the user of this apparatus are calculated based on the position of the marker in the image. In this case, the marker corresponds to the measuring target 301, the external image sensing device corresponds to the measurement device 302, and the calculator which performs the aforementioned image processing corresponds to the sensor control device 303. Alternatively, it is also possible to sense the user of this apparatus by an image sensing device without mounting an explicit marker to the user, and calculate the position and/or orientation of the user based on an image characteristic of the user. In this case, the user of this apparatus corresponds to the measuring target 301.

Alternatively, a plurality of markers (not shown) which serve as a landmark are provided in the space where this apparatus is used, then image processing is performed on an image sensed by the imaging device 202, and the position and/or orientation of the user of this apparatus are calculated based on the position of the marker in the image. In this case, the user of this apparatus replaces the measuring target 301, the marker replaces the measurement device 302, and the calculator which performs aforementioned image processing replaces the sensor control device 303. Alternatively, it is also possible to extract an image characteristic from an image sensed by the imaging device 202 without providing an explicit marker as a landmark in the space where this apparatus is used, and the position and/or orientation of the user can be calculated. In this case, the measurement device 302 corresponds to the space itself where this apparatus is used.

Furthermore, in a case of measuring the position and/or orientation of the user of this apparatus by combining a plurality of sensors and measurement techniques, the construction as a whole can be regarded as the sensor unit 300. In other words, the sensor unit 300 is an apparatus where the measuring target 301 is observed by the measurement device 302 and where the sensor control device 303 outputs the position and/or orientation of the measuring target 301 based on the observed data. Therefore, the principle and technique for calculating the position and/or orientation are no object.

Furthermore, in the first embodiment, although the sensor unit 300 measures the position and/or orientation of the user of this apparatus, the sensor 300 may measure the position only.

Figure 2:
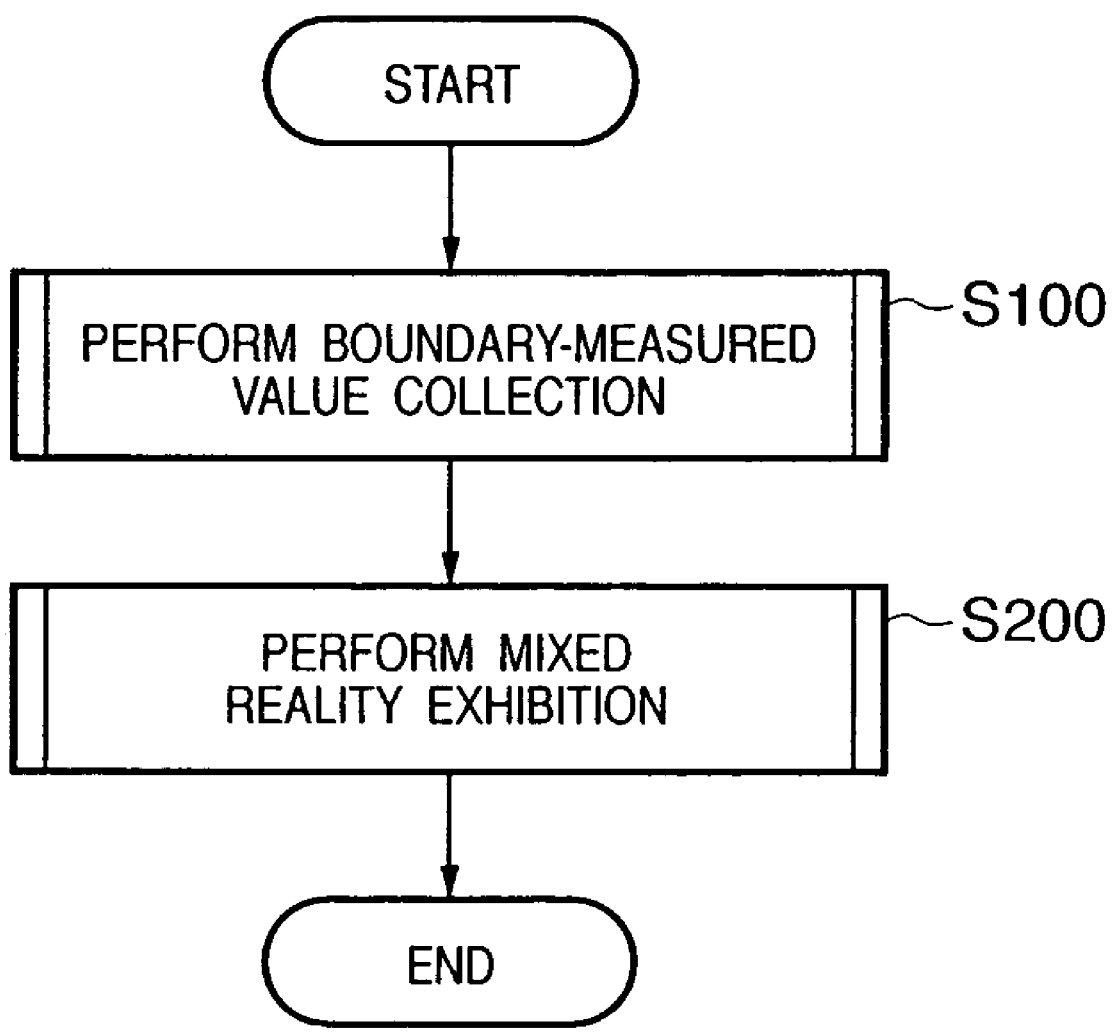
FIG. 2 is a flowchart describing an overall procedure of the mixed reality apparatus according to the first embodiment.

Hereinafter, the control according to the first embodiment having the above-described construction is described. FIG. 2 is a flowchart describing a procedure of the mixed reality apparatus according to the first embodiment. Note that the program codes according to the flowchart are stored in a storage device such as the disk device 106 or RAM 102 of the apparatus according to the first embodiment, read out of the storage device and executed by the CPU 101.

In step S100, prior to mixed reality exhibition processing of this apparatus, boundary-measured value collection processing is performed since it will be necessary in step S200. The boundary-measured value represents a position of the boundary-measured point 30 described in FIGS. 6 and 7, which is measured by the sensor unit 300. Details of the boundary-measured value collection processing will be described later with reference to the flowchart in FIG. 3. Next in step S200, mixed reality is exhibited to the user by the mixed reality apparatus according to the first embodiment. Details of the mixed reality exhibition processing will be described later with reference to the flowchart in FIG. 4.

Figure 3:
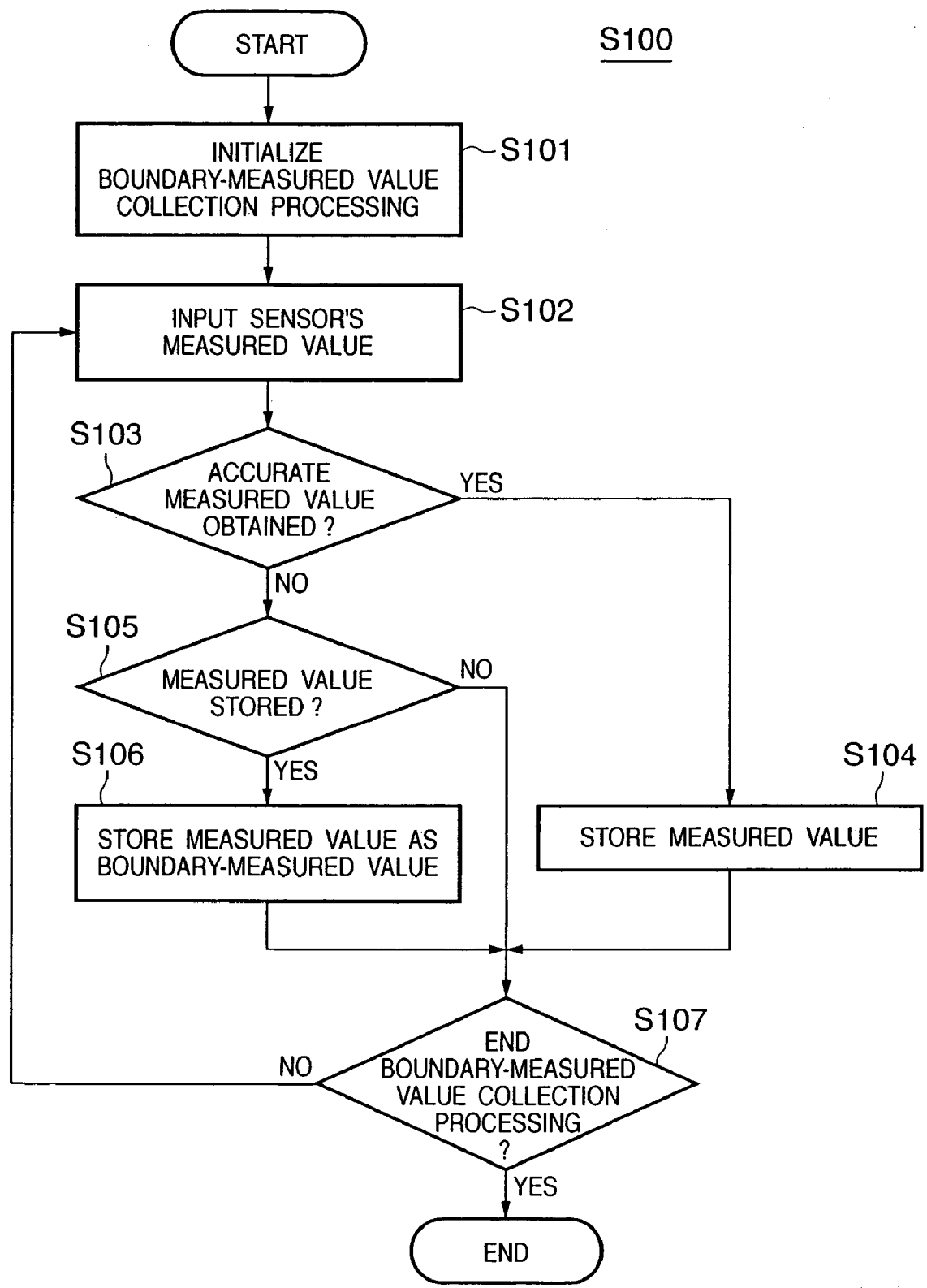
FIG. 3 is a flowchart describing a boundary-measured value collection procedure according to the first embodiment.

FIG. 3 is a flowchart describing in detail the boundary-measured value collection processing performed in step S100 by the mixed reality apparatus according to the first embodiment.

In step S101, initializing necessary for the boundary-measured value collection processing is performed (basically sensor set-up is performed). In step S102, the input device 107 acquires a measured value outputted by the sensor control device 303 of the sensor unit 300. The CPU 101 converts the acquired measured value (position and/or orientation of the measuring target 301) to the viewpoint position and/or orientation of the apparatus' user. In step S103, it is determined whether or not an accurate measured value is obtained in step S102. Herein, "accurate" means that the error of the measured value is smaller than a tolerance value. In a case where an accurate measured value is obtained, the control proceeds to step S104 and the measured value is stored in the RAM 102.

In a case where, for instance, an optical sensor is employed as the sensor unit 300, no value can be acquired if the user goes outside the sensor's measurement area. Therefore, the determination in step S103 is easily realized by determining whether or not a measured value is obtained. Contrary, in a case where, for instance, a magnetic sensor is employed as the sensor unit 300, even when the user goes outside the sensor's measurement area, a measured value itself can be obtained although the measurement error increases. In this case, for instance, measured values are stored as a history in step S102, and when a variation in the measured values exceeds a default value, determination of not obtaining an accurate value is made in step S103. The default value can be calculated based on an assumable moving distance (maximum distance in the sensor's measurement sampling interval) of the user of this apparatus and an error assured by the sensor. For instance, "the maximum moving distance+error" can be adopted as the default value.

Referring to step S104 where the measured value obtained in step S102 is stored in the RAM 102, if a measured value has already been stored, the old measured value is discarded. In other words, only the most current value among the values measured by the sensor unit 300 is stored.

Meanwhile, in a case where an accurate measured value is not obtained in step S102, the control proceeds from step S103 to step S105. In step S105, it is determined whether or not a measured value has been stored in the RAM 102. In a case where a measured value has been stored, the control proceeds to step S106, where the measured value stored in the RAM 102 is stored in the disk device 105 as the measured value of the boundary-measured point 30 (boundary-measured value). In the first embodiment, the control reaches step S106 only when an accurate measurement value is obtained in the previous measurement of the sensor unit 300 but not obtained in the current measurement. This represents the shift from the state indicated as 6A to the state indicated as 6B, shown in FIG. 6. The measured value stored in the RAM 102 at this point is adopted as the boundary-measured value. After the boundary-measured value is stored, the measured value stored in the RAM 102 may be discarded.

Note, in the first embodiment, although all the boundary-measured values obtained are stored in the disk device 105, all the boundary-measured values do not have to be stored. For instance, the stored boundary-measured values may be analyzed by statistical means, and a value that is determined to have low accuracy may be excluded. Alternatively, at the time of storing a boundary-measured value in the disk device 105, whether or not to store the value may be determined by comparing the continuity with the boundary-measured values measured so far.

In step S107, it is determined whether or not to end the boundary-measured value collection processing. The determination of ending the boundary-measured value collection processing is made by whether or not the user has performed an end designation operation. To continue collection of the boundary-measured values, the control returns to step S102; otherwise, the boundary-measured value collection processing ends.

According to the first embodiment, in the process of collecting boundary-measured values, the boundary-measured value is stored each time in the disk device 105 in step S106. However, it goes without saying that it is also possible to hold the boundary-measured value in the RAM 102 in the process of collecting the values, and store them all at once in the disk device 105 when the boundary-measured value collection ends.

Figure 4:
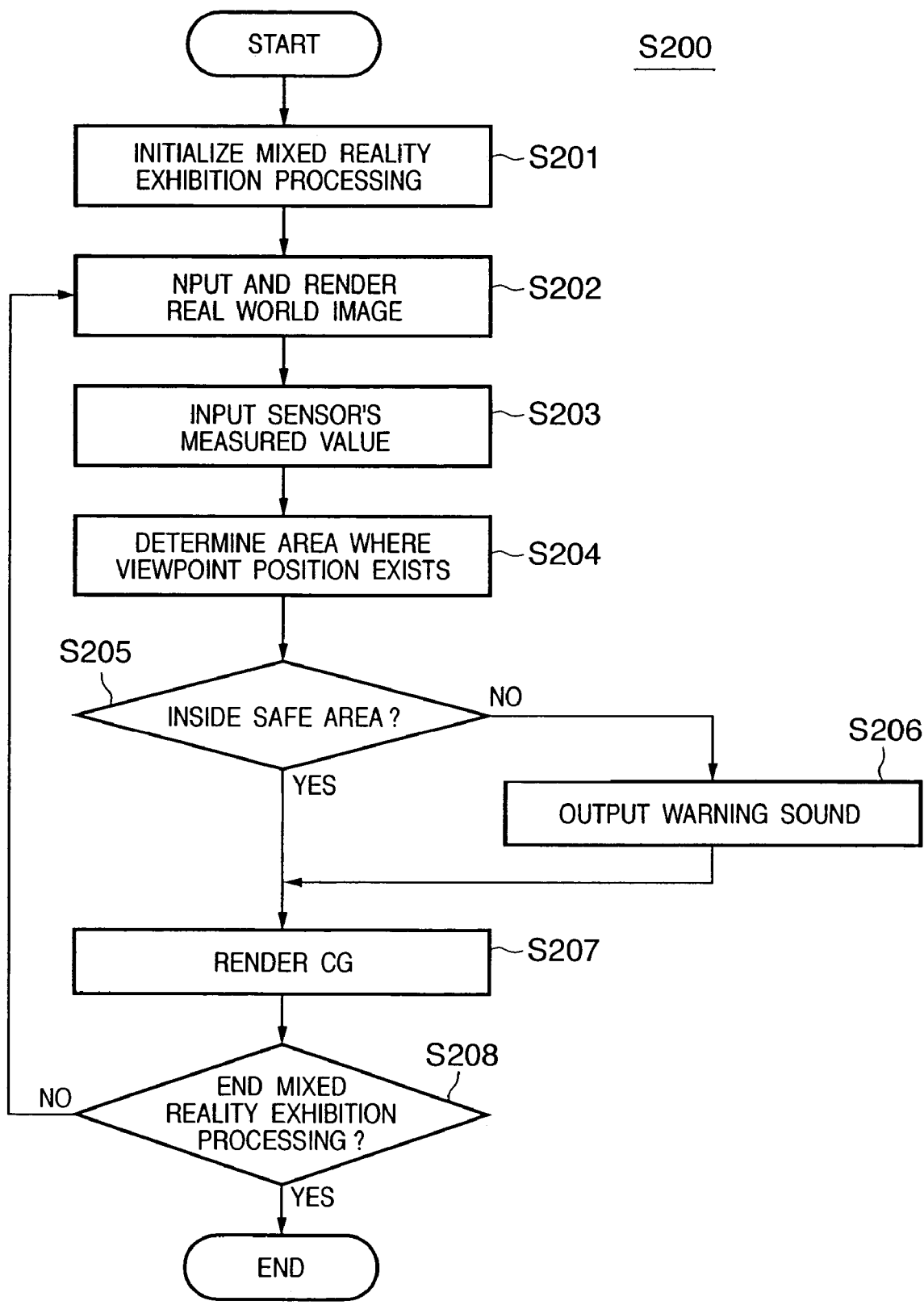
FIG. 4 is a flowchart describing a mixed reality exhibiting procedure according to the first embodiment.

Next, mixed reality exhibition processing according to the first embodiment is described. FIG. 4 is a flowchart describing in detail the mixed reality exhibition processing performed in step S200 by the mixed reality apparatus according to the first embodiment.

In step S201, initializing necessary for the mixed reality exhibition processing is performed. For instance, the CPU 101 reads necessary data, e.g., virtual world CG object data, warning CG object data, boundary-measured value CG object data, boundary-measured value data stored in boundary-measured value collection processing (S100), warning audio data, program control data and so on, from the disk device 105 and writes it in the RAM 102.

In step S202, the video input device 108 inputs a real world image seen from the viewpoint of the user of this apparatus, which is sensed by the imaging device 202, and writes the image data in the RAM 102. The CPU 101 reads the image data out of the RAM 102, performs correction processing if necessary, and writes the image data in a frame buffer of the graphics memory of the video output device 104. Note that the video input device 108 may directly writes the inputted image in the frame buffer of the graphics memory of the video output device 104 without an intermediation of the RAM 102. Note that the control in step S202 is not necessary in a case where an optical see-through display device is employed as the display device 201.

In step S203, the input device 107 obtains a measured value outputted by the sensor control device 303 of the sensor unit 300. The CPU 101 converts the acquired measurement value to the viewpoint position and/or orientation of the apparatus' user, and writes it in the RAM 102. In step S204, the CPU 101 determines whether or not the viewpoint position of the apparatus' user exists in the safe area 40 described in FIG. 8, based on the viewpoint position of the apparatus' user converted in step S203 and the plurality of boundary-measured values stored in the RAM 102. If the viewpoint position does not exist inside the safe area 40, warning sound is outputted. The warning sound may be changed from the case where the viewpoint position exists in the warning area 50 to the case where the viewpoint position does not exist in the safe area 40 or the warning area 50 (exists outside the movable area 60).

The determination of whether or not the viewpoint position of the apparatus' user exists inside the safe area 40 and warning area 50 is performed, for instance, in the following manner. Herein, assume that the boundary-measured points 30 are points that exist on the horizontal plane, and coordinate system thereof is two-dimensional. Further assume that the safe area 40 exists in the inner side of the movable area 60, and is analogous to the movable area 60. The warning area 50 is defined to be an area where the safe area 40 is excluded from the movable area 60. The size of the safe area 40 is defined by a constant k (k is an arbitrary real number ranging from 0 to 1). When the constant k is 0, the size of the safe area 40 becomes 0, i.e., the safe area 40 does not exist. When the constant K is 1, the safe area 40 falls in with the movable area 60, i.e., the warning area 50 does not exist.

Figure 11:
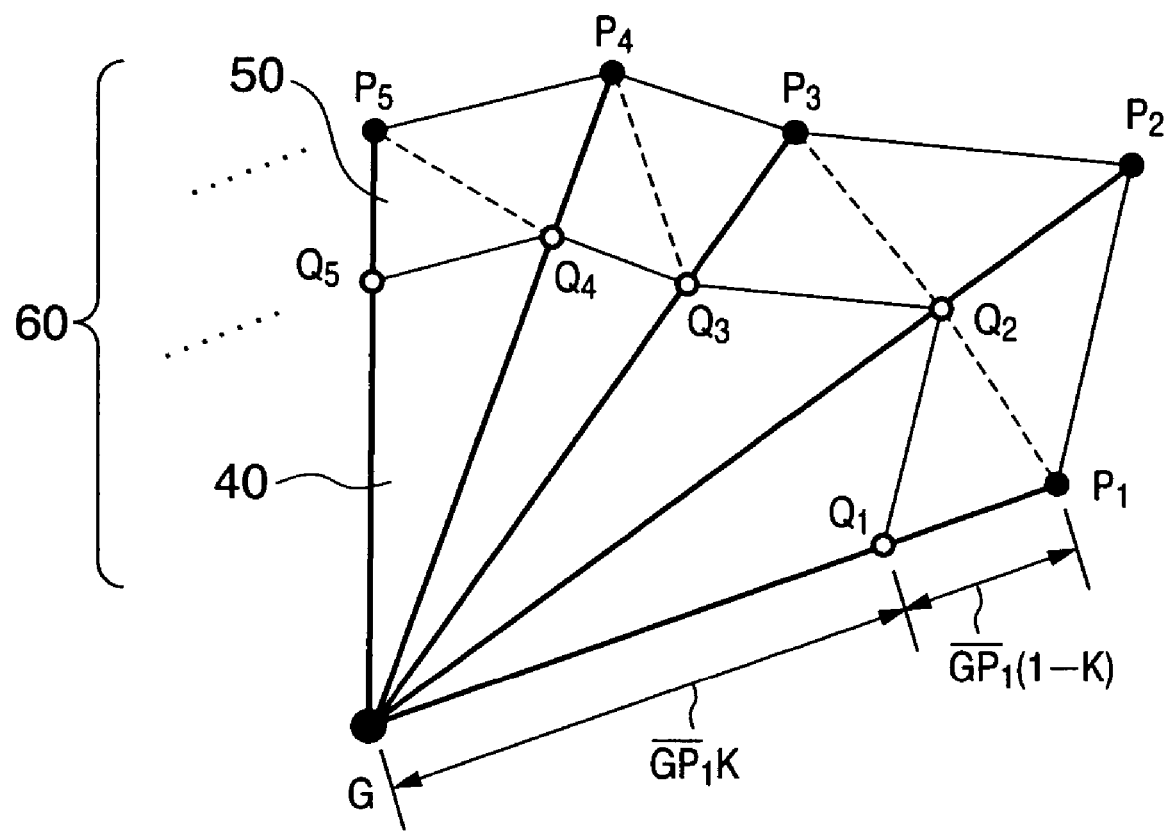
FIG. 11 is an explanatory view of safe-area and warning-area setting.

An example on how to set the movable area, safe area, and warning area is described with reference to FIG. 11. First, when the boundary-measured points are defined as P ($P_1$, $P_2$, . . . ), a point G which is the barycenter of the boundary-measured points P is obtained. Next, with respect to a line segment connecting the point G and an arbitrary point $P_n$ of the boundary-measured points P, a point $Q_n$ which divides the line segment at the ratio of k:(1−k) is obtained. The point $Q_n$ becomes the boundary point between the safe area 40 and the warning area 50. Points $Q_1$, $Q_2$, . . . are obtained with respect to all the boundary-measured points P, thereby obtaining a set of points Q as the warning area boundary points Q.

Next, the safe area 40 and the warning area 50 are defined based on the points P and Q. By sequentially connecting respective points P or sequentially connecting respective points Q with a line, a border line of a closed area can be made. The closed area formed with the points P is the movable area 60. The closed area formed with the points Q is the safe area 40. These closed areas can be obtained by dividing each area with a triangular mesh based on the points.

As means for dividing an area by constructing a triangular mesh based on points, Delaunay's area division method is widely known. Delaunay's division method is a method of forming triangles with respect to all the given points by constructing a triangle, having arbitrary three points of the given points as the vertices, in a way that the inner portion of the circumscribed circle of the arbitrary three points does not include any other points.

With respect to each of the points P∪Q and points Q, triangular meshes M and S are constructed by applying the area division means, e.g., Delaunay's area division method. The triangular mesh M constructed with respect to points P∪Q forms the movable area 60, while the triangular mesh S constructed with respect to points Q forms the safe area 40. The area where the triangular mesh S is excluded from the triangular mesh M is the triangular mesh A which forms the warning area 50. At this stage, a triangle structure table 400 shown in FIG. 12 is generated in the RAM 102. The triangle structure table 400 stores an index of a vertex that constitutes each triangle.

Figure 13:
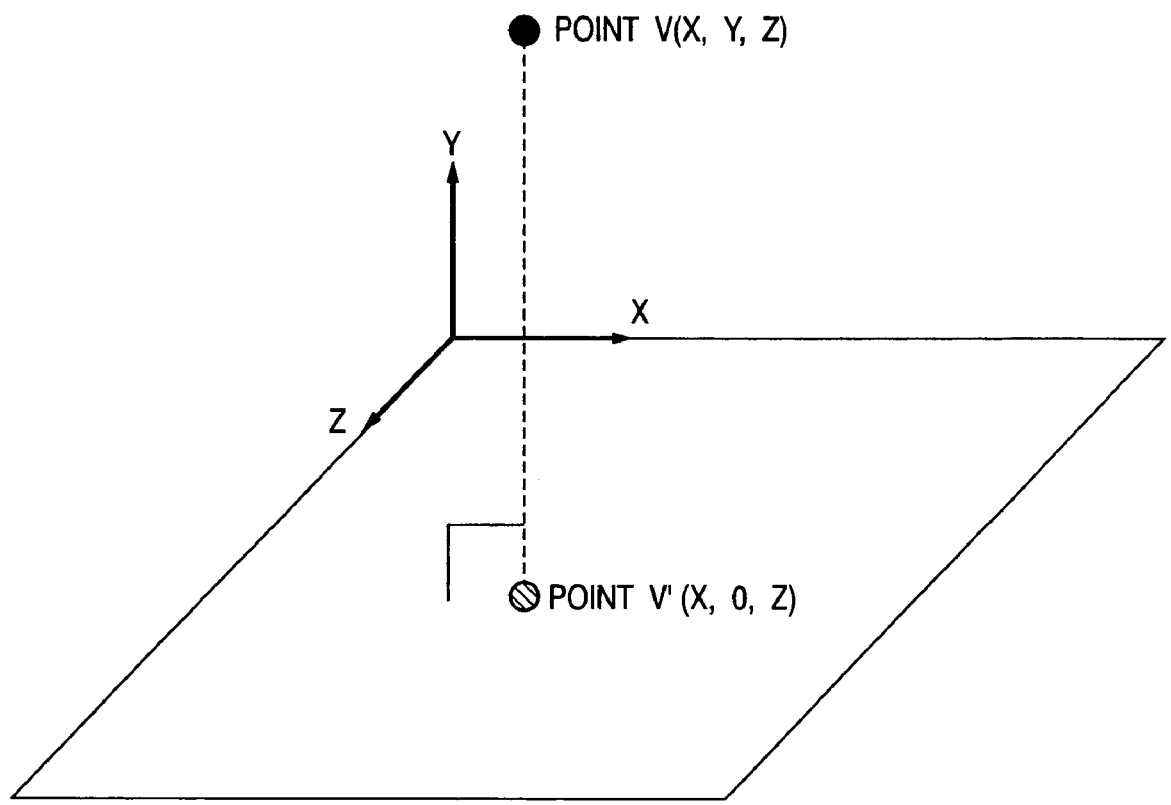
FIG. 13 is a view showing how a viewpoint position V is projected to a point V' on the horizontal plane.

Upon defining the safe area 40 and the warning area 50 in the above-described manner, the viewpoint position V of the user of this apparatus obtained in step S203 is projected to the point V' on the horizontal plane. FIG. 13 is an explanatory view of projecting V to V', assuming that the horizontal plane Z=0 stands. It is determined whether the point V' exists inside any of the triangles constituting the triangular mesh S or any of the triangles constituting the triangular mesh A. If the point V' exists inside the triangle constituting one of the triangular meshes, then it is decided that the point V' exists inside the area corresponding to that triangular mesh. More specifically, if the point V' exists inside the triangular mesh S, it is determined that the point V' exists inside the safe area 40, while if the point V' exists inside the triangular mesh A, it is determined that the point V' exists inside the warning area 50. If the point V' exists in neither the safe area 40 nor the warning area 50, it is determined that the point V' exists outside the movable area 60.

The determination of whether or not the point V' exists inside a triangle T, i.e., the determination of inclusive relation between a triangle and a point, is performed, for instance, in the following manner.

Assume that respective vertices of a triangle T are $T_1$, $T_2$, and $T_3$, and respective sides connecting each vertex are $T_1T_2$, $T_2T_3$, and $T_3T_1$. With respect to the line segments V'$T_1$, V'$T_2$, and V'$T_3$ connecting the point V' with the respective vertices $T_1$, $T_2$, and $T_3$ of the triangle T, determination is made as to whether or not the line segment intersects with any of the three sides of the triangle T. More specifically, with respect to the line segments V'$T_1$ and $T_2T_3$, the line segments V'$T_2$ and $T_3T_1$, and the line segments V'$T_3$ and $T_1T_2$, it is determined whether or not these line segments intersect. If one of these line segments intersects, it is decided that the point V' exists inside the triangle T. If none of these line segments intersects, it is decided that the point V' exists outside the triangle T.

Note that the above-described determination method of inclusive relation between a triangle and a point is a mere example; thus, other determination methods can be employed.

Figure 14:
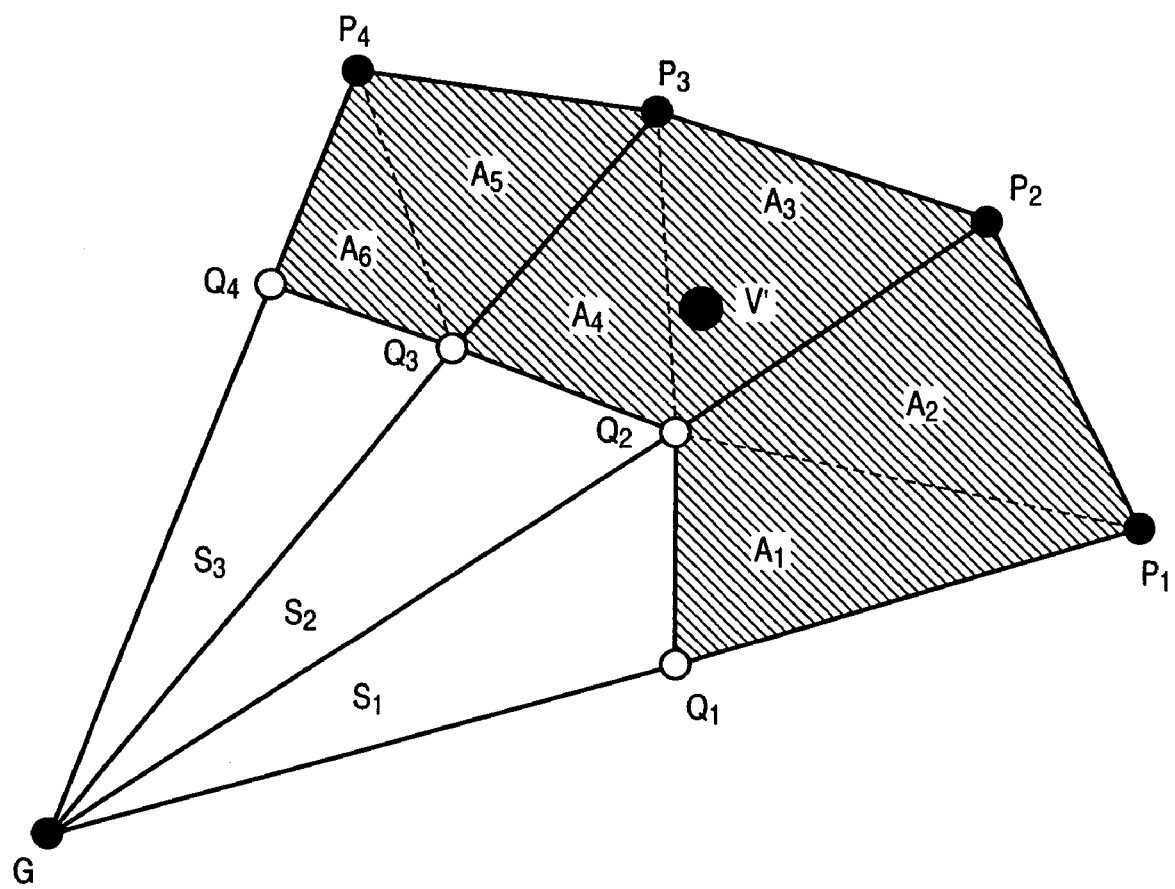
FIG. 14 is an explanatory view of a determination method of whether or not the point V' exists inside the safe area 40 or the warning area 50.

Hereinafter, the method of determining whether or not the point V' exists inside the safe area 40 or the warning area 50 is described in detail with reference to FIG. 14.

First, a triangle $S_n$ is constructed by utilizing the triangle structure table 400 in FIG. 12. With respect to each triangle $S_n$, whether or not the point V' exits inside the triangle $S_n$ is determined. The above-described method is applied to determine the inclusive relation between the point V' and the triangle $S_n$. If the point V' exists inside the triangle $S_n$, it is determined that the point V' exists inside the safe area 40. In the example shown in FIG. 14, since the point V' does not exist inside the safe area 40, the control proceeds to the next step. A triangle $A_n$ is constructed by utilizing the triangle structure table 400. With respect to each triangle $A_n$, whether or not the point V' exits inside the triangle $A_n$ is determined. If the point V' exists inside the triangle $A_n$, it is determined that the point V' exists inside the warning area 50. Referring to the example shown in FIG. 14, in the determination processing of inclusive relation between the point V' and the triangle $A_3$, it is determined that the point V' exists inside the triangle $A_3$. Therefore, it is decided that the point V' exists inside the warning area 50. If it is determined in this step that the point V' does not exist inside the warning area 50, it means that the point V' exists in neither the safe area 40 nor the warning area 50. In other words, it is decided that the point V' exists outside the movable area 60.

Note, although the first embodiment assumes that the boundary-measured points are two-dimensional points that exist on the horizontal plane, the boundary-measured points may be treated as three-dimensional points. In this case, each of the safe area 40, warning area 50 and movable area 60 is a three-dimensional closed area, and determination must be made as to whether or not the viewpoint position V of the apparatus' user exists inside the closed area. More specifically, a triangular mesh that constitutes the face of the closed area is obtained from the points, and determination is made as to whether or not the viewpoint position V exists inside the triangular mesh. In this case, the procedure for obtaining the triangular mesh is equivalent to the procedure for constructing polygons of a CG model based on three-dimensional points in the 3D computer graphics field. Besides the Delaunay's area division method, many methods such as the Free Mesh Method, Bubble Mesh Method and so on have been proposed, and one of these methods can be applied.

In the first embodiment, although a triangular mesh for defining the closed area is constructed from boundary-measured points, the method is not limited to this. As long as the means can determine based on the boundary-measured points whether or not the viewpoint position of the apparatus' user-exists in the safe area 40 or the warning area 50, any method can be employed.

In step S205, the subsequent processing is controlled based on the determination on the type of area that includes the viewpoint position of the apparatus' user, which is determined in step S204. In a case where the viewpoint position of the apparatus' user exists inside the safe area 40, the control proceeds to step S207. In a case where the viewpoint position of the apparatus' user exists inside the warning area 50 or outside the movable area 60, the control proceeds to step S206.

In step S206, the CPU 101 reads out of the RAM 102 the warning sound data warning that the user is inside the warning area 50 or outside the movable area 60, and outputs the warning sound data to the audio output device 103. By the control in step S206, it is possible to clearly notify the user of this apparatus that the user is currently near the boundary of the movable area 60. In a case of not outputting the warning sound, the control in step S206 does not have to be performed.

In step S207, the CPU 101 reads out of the RAM 102 CG object data of a virtual world, renders CG based on the viewpoint position and/or orientation of the user of this apparatus, which are calculated in step S203, and outputs the CG to the graphics memory. The video output device 104 synthesizes the data rendered in various buffer of the graphics memory, and outputs a-video signal to the display device 201. In a case where the video output device 104 comprises a computing device dedicated to rendering, e.g., graphics accelerator, all the control in step S207 is performed by the video output device 104.

In a case where it is determined in step S205 that the viewpoint position exists inside the warning area 50, the CPU 101 renders boundary-measured value rendering CG on the coordinate system where the boundary-measured values are projected on the horizontal plane. By virtue of this, it is possible to visually notify the user of this apparatus that the user's current position is near the boundary of the movable area 60. Furthermore, in a case where it is determined that the viewpoint position exists inside the warning area 50, the plane or the boundary line of the warning area 50 may be rendered by CG instead of the boundary-measured value rendering CG to notify the user of this apparatus that the user is near the boundary of the movable area 60. Meanwhile, in a case where it is determined in step S205 that the viewpoint position exists outside the movable area 60, it may be controlled such that step S207 is not performed. In step S208, it is determined whether or not to continue the mixed reality exhibition processing (end designation performed/not performed). To continue the processing, the control returns to step S202. To end the processing, the mixed reality exhibition control is terminated.

Figure 9:
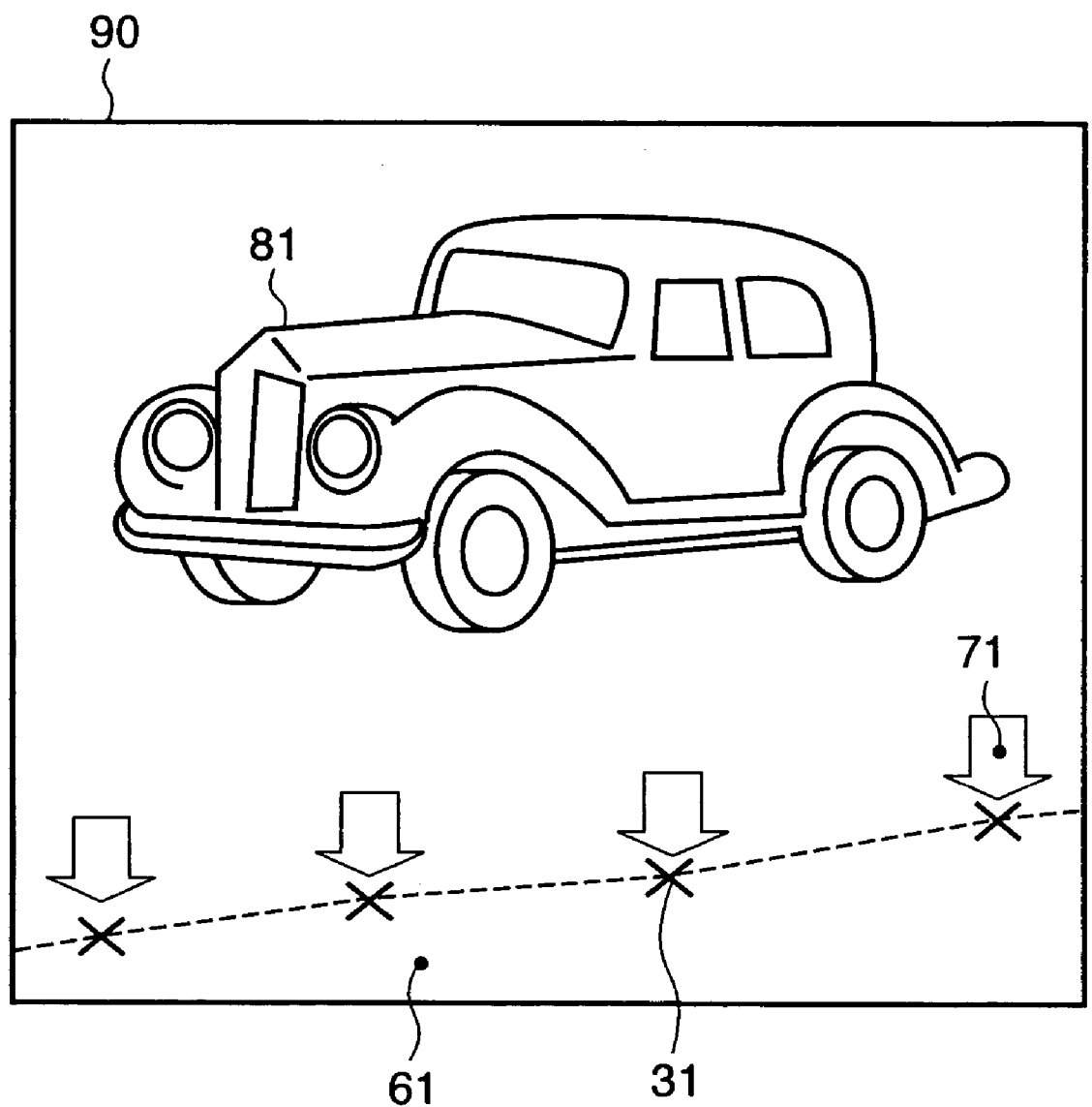
FIG. 9 is a view showing an example of an image displayed by the mixed reality apparatus according to the first embodiment.

FIG. 9 shows an example of an image displayed on the display unit 200. The image inside the frame of the square shown in FIG. 9 represents a synthesized image 90 displayed on the display unit 200. The synthesized image 90 is an image obtained by superimposing a virtual world image on the real world image. In a case where it is determined in step S205 that the user's viewpoint position exists inside the safe area 40, the synthesized image 90 is configured with the real world image (not shown) and a virtual CG object 81. On the contrary, in a case where it is determined that the user's viewpoint position exists inside the warning area 50, the synthesized image 90 is configured with, in addition to the real world image (not shown) and the virtual CG object 81, a boundary-measured point CG object 31, a movable area CG object 61, and an indicator CG object 71.

The virtual CG object 81, which is the main CG object exhibited to the user of this apparatus, is rendered by CG in step S207 as a virtual image. The boundary-measured point CG object 31 is a CG object for showing the user of this apparatus the positions of the boundary-measured points that cannot be viewed in the real world. The indicator CG object 71 is a CG object for auxiliary indicating the position where the boundary-measured point CG object 31 is displayed. The boundary-measured point CG object 31 and indicator CG object 71 are rendered by CG in step S207 as a virtual image for representing the coordinates of the boundary-measured values collected in step S100. Note that although the boundary-measured point CG object 31 is indicated by the mark X and the indicator CG object 71 is indicated by an arrow in FIG. 9, these are mere examples and any shape of CG objects may be rendered.

The movable area CG object 61 is a CG object for showing the user of this apparatus the movable area 60 that cannot be viewed in the real world. The range of the movable area 60 can be exhibited to the user of this apparatus by rendering in step S207 the portion corresponding to the movable area 60 on the horizontal plane with polygon or wire frame CG having a specific color as a virtual image.

Note, according to the first embodiment, although a CG object indicative of the movable area 60 is displayed, CG objects indicative of the safe area 40 and warning area 50 may be displayed.

Furthermore, according to the first embodiment, in a case where the user is inside the warning area 50, all the boundary-measured point CG object 31, movable area CG object 61 and indicator CG object 71 are displayed. However, only part of these CG objects may be displayed. It may also be constructed so that displaying/not displaying the respective CG objects can be switched by operation of the user of this apparatus or an operator (not shown).

As mentioned above, in a case where it is determined that the user's viewpoint position exists inside the safe area 40, the synthesized image 90 is configured with the real world image and the virtual CG object 81, but the boundary-measured point CG object 31, the movable area CG object 61, and the indicator CG object 71 are not rendered in step S207. However, even in a case where it is determined that the user's viewpoint position exists inside the safe area 40, all or part of the boundary-measured point CG object 31, the movable area CG object 61, and the indicator CG object 71 may be rendered in step S207. Furthermore, it may also be constructed so that displaying/not displaying the respective CG objects can be switched by operation of the user of this apparatus or an operator (not shown).

Second Embodiment

According to the first embodiment, boundary-measured value collection processing is not performed while mixed reality exhibition processing is executed (step S200 in FIG. 2). According to the mixed reality apparatus of the second embodiment, boundary-measured value collection is performed not only in step S100, but also during the mixed reality exhibition processing in step S200. By virtue of this control, the safe area 40, the warning area 50, and the movable area 60 can be updated in real time, so that it is possible to provide even more appropriate guidance to the user in a way that the user does not go outside the movable area.

The brief construction of the mixed reality apparatus according to the second embodiment, the overall processing flow, and details of the boundary-measured value collection processing performed in step S100 are the same as those of the first embodiment. Note that the boundary-measured value collection processing in step S100 does not necessarily have to be performed.

Figure 10:
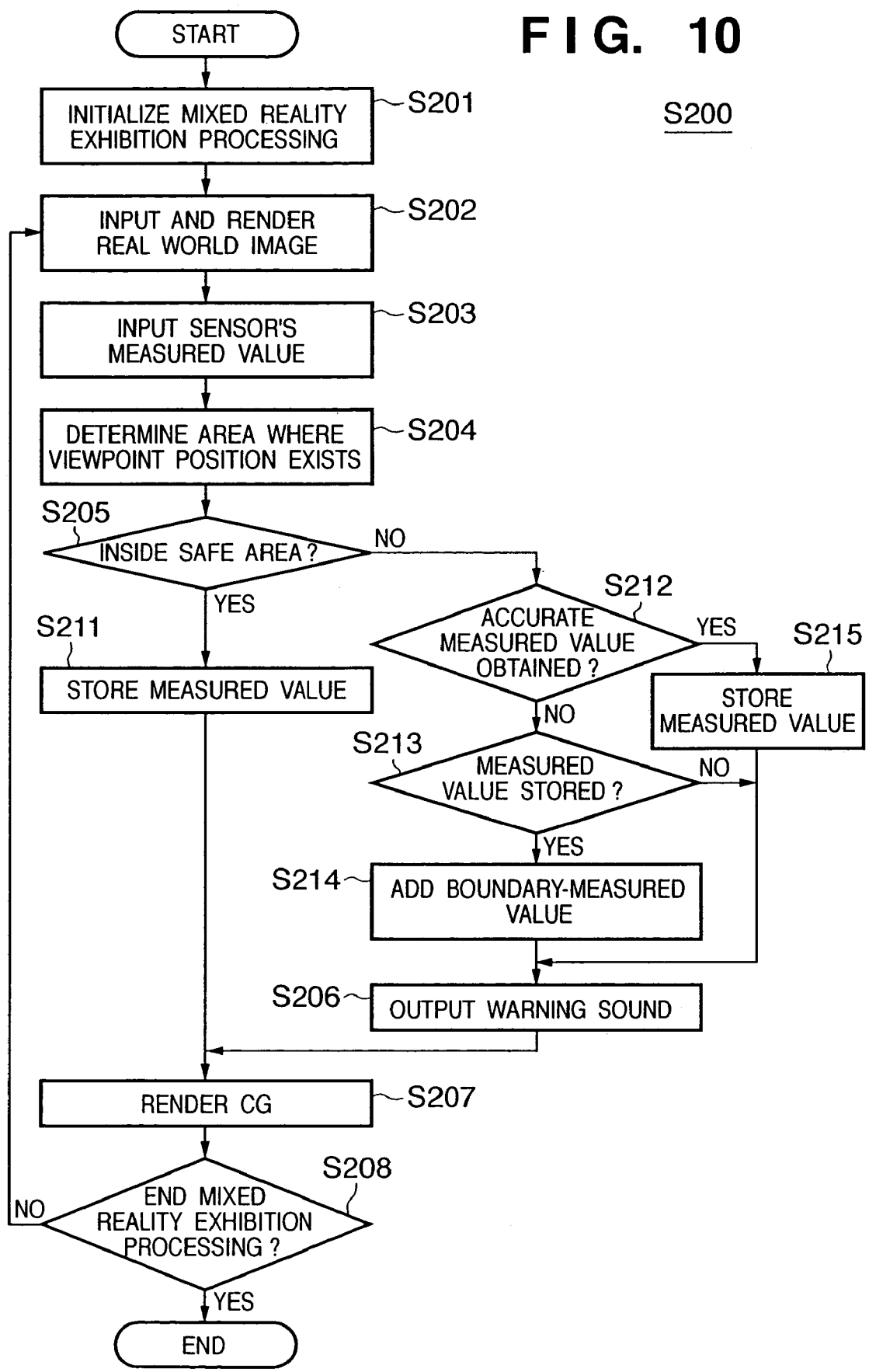
FIG. 10 is a flowchart describing a mixed reality exhibiting procedure according to the second embodiment.

FIG. 10 is a flowchart describing in detail the mixed reality exhibition processing performed in step S200 by the mixed reality apparatus according to the second embodiment. The control performed in steps S201 to S204 and the control performed in steps S206 to S208 in FIG. 10 are the same as those of the first embodiment. The control performed in steps S211 to S215 is the processing based on steps S103 to S106 described in the first embodiment.

In step S205, the subsequent processing is controlled based on the determination on the type of area that includes the viewpoint position of the apparatus' user, which is determined in step S204. In a case where the viewpoint position of the apparatus' user exists inside the safe area 40, the control proceeds to step S211; whereas in a case where the viewpoint position exists inside the warning area 50 or outside the movable area 60, the control proceeds to step S212.

In step S211, the measured value obtained in step S203 is stored in the RAM 102. If a measured value has already been stored, the old measured value is discarded. In other words, only the most current value among the values measured by the sensor unit 300 is stored. In step S212, it is determined whether or not an accurate measured value is obtained (determined by the similar method to that of step S103 in FIG. 3). In a case where it is determined that an accurate measured value is obtained, the control proceeds to step S215 where the measured value is stored in the RAM 102, then the control proceeds to step S206. Meanwhile, in a case where an accurate measured value is not obtained, the control proceeds to step S213 where it is determined whether or not a measured value has been stored in the RAM 102. In a case where a measured value has been stored, the control proceeds to step S214; otherwise, the control proceeds to step S206. In step S214, the measured value stored in the RAM 102 is added to the boundary-measured value data as the measured value of the boundary-measured point 30 (boundary-measured value). Note that updating the triangular mesh in each area that comes along with addition (updating) of the boundary-measured value data may be performed off-line after the above-described mixed reality exhibition processing is completed. Alternatively, it may be performed in the background during the mixed reality exhibition processing to update the area data.

In the second embodiment, when the user goes outside the sensor's measurement area 20 during the mixed reality exhibition processing in step S200, the boundary-measured value at this point is added to the boundary-measured value data. By virtue of this, it is possible to increase the precision of the boundary-measured value data while exhibiting the mixed reality. Furthermore, it is possible to handle the situation even if the number of boundary-measured values collected in the boundary-measured value collection processing in step S100 turns out to be insufficient during the mixed reality exhibition processing in step S200.

Other Embodiment

The object of the present invention can also be achieved by providing a storage medium, storing program codes of software realizing the above-described functions of the embodiments, to a computer system or apparatus, reading the program codes, by a computer (CPU or MPU) of the system or apparatus, from the storage medium, then executing the program.

In this case, the program codes read from the storage medium realize the functions according to the embodiments, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs part or the entire processes in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-406143 filed on Dec. 4, 2003, which is hereby incorporated by reference herein.

What is claimed is:

1. An information processing method comprising:
an acquisition step of acquiring position data representing a position and orientation of a user based on a detection signal from a sensor;
a storage step of storing the position data in a memory unit;
a recording step of recording a plurality of boundary-measured points, wherein each of the plurality of boundary-measured points indicates a last measured point when a state of the sensor shifts from measurable to non-measurable due to movement of a measured point;
a generation step of generating a virtual image based on current position data acquired in said acquisition step;
a synthesizing step of synthesizing the virtual image with a real image corresponding to the virtual image;
a determination step of determining a measurable area of the position and orientation of the user based on the plurality of recorded boundary-measured points of the sensor, wherein the measurable area is a closed area obtained by connecting the plurality of boundary-measured points;

a setting step of setting a warning area inside the measurable area determined in said determination step, the warning area being set along a boundary of the measurable area; and a control step of controlling notification related to the warning area set in said setting step.

2. The method according to claim 1, wherein the warning area is a two-dimensional area.

3. The method according to claim 1, wherein the warning area is set to the edge of the measurable area.

4. The method according to claim 1, wherein the measurable area further includes a safe area except the warning area, and in said controlling step, a warning is given when the position of the user is inside the warning area.

5. The method according to claim 1, wherein said notification is to output predetermined sound.

6. The method according to claim 1, wherein said notification is to display a virtual image indicative of the warning area.

7. The method according to claim 1, wherein in order to update the warning area at any time, the current position data representing the position and orientation of the user employed in said generation step is used.

8. The method according to claim 1, further comprising:
an obtaining step of obtaining a real image corresponding to the position and orientation of the user; and
a calculation step of calculating the position data representing the position and orientation of the user based on the real image.

9. A control program embodied in a computer readable medium for causing a computer to execute an information processing method comprising:
an acquisition step of acquiring position data representing a position and orientation of a user based on a detection signal from a sensor;
a storage step of storing the position data in a memory unit;
a recording step of recording a plurality of boundary-measured points, wherein each of the plurality of boundary-measured points indicates a last measured point when a state of the sensor shifts from measurable to non-measurable due to movement of a measured point;
a generation step of generating a virtual image based on current position data acquired in said acquisition step;
a synthesizing step of synthesizing the virtual image with a real image corresponding to the virtual image;
a determination step of determining a measurable area of the position and orientation of the user based on the plurality of recorded boundary-measured points of the sensor, wherein the measurable area is a closed area obtained by connecting the plurality of boundary-measured points;
a setting step of setting a warning area inside the measurable area determined in said determination step, the warning area being set along a boundary of the measurement area; and
a control step of controlling notification related to the warning area set in said setting step.

10. A computer readable medium encoded with a control program for causing a computer to execute an information processing method comprising:
an acquisition step of acquiring position data representing a position and orientation of a user based on a detection signal from a sensor;
a storage step of storing the position data in a memory unit;
a recording step of recording a plurality of boundary-measured points, wherein each of the plurality of boundary-measured points indicates a last measured point when a state of the sensor shifts from measurable to non-measurable due to movement of a measured point;
a generation step of generating a virtual image based on current position data acquired in said acquisition step;
a synthesizing step of synthesizing the virtual image with a real image corresponding to the virtual image;
a determination step of determining a measurable area of the position and orientation of the user based on the plurality of recorded boundary-measured points of the sensor, wherein the measurable area is a closed area obtained by connecting the plurality of boundary-measured points;
a setting step of setting a warning area inside the measurable area determined in said determination step, the warning area being set along a boundary of the measurable area; and
a control step of controlling notification related to the warning area set in said setting step.

11. An information processing apparatus comprising:
an acquisition unit which acquires position data representing a position and orientation of a user based on a detection signal from a sensor;
a memory unit which stores the position data;
a recording unit to record a plurality of boundary-measured points, wherein each of the plurality of boundary-measured points indicates a last measured point when a state of the sensor shifts from measurable to non-measurable due to movement of a measured point;
a generation unit which generates a virtual image based on current position data acquired by said acquisition unit;
a synthesizing unit which synthesizes the virtual image with a real image corresponding to the virtual image;
a determination unit which determines a measurable area of the position and orientation of the user based on the plurality of recorded boundary-measured points of the sensor, wherein the measurable area is a closed area obtained by connecting the plurality of boundary-measured points;
a setting unit which sets a warning area inside the measurable area determined by said determination unit, the warning area being set along a boundary of the measurable area; and
a control unit which controls notification related to the warning area set by said setting unit.

12. The apparatus according to claim 11, further comprising a head mounted display unit which displays a mixed reality image outputted from said synthesizing unit, wherein the real image is sensed by a camera of said head mounted display unit.

* * * * *

UNITED STATES PATENT AND TRADEMARK OFFICE
CERTIFICATE OF CORRECTION

PATENT NO. : 7,330,197 B2  Page 1 of 1
APPLICATION NO. : 11/002074
DATED : February 12, 2008
INVENTOR(S) : Toshihiro Kobayashi et al.

It is certified that error appears in the above-identified patent and that said Letters Patent is hereby corrected as shown below:

<u>SHEET 4</u>:

FIG. 4, "NPUT" should read --INPUT--.

<u>COLUMN 10</u>:

Line 40, "writes" should read --write--.

<u>COLUMN 12</u>:

Line 30, "exits" should read --exists--.

<u>COLUMN 13</u>:

Line 9, "user-exists" should read --user exists--.
Line 35, "a-video" should read --a video--.

Signed and Sealed this

Thirty-first Day of March, 2009

JOHN DOLL
*Acting Director of the United States Patent and Trademark Office*